Feb. 27, 1968  R. D. RUMSEY  3,370,638
PISTON HATCH ACTUATOR ASSEMBLY
Filed July 6, 1966  3 Sheets-Sheet 3
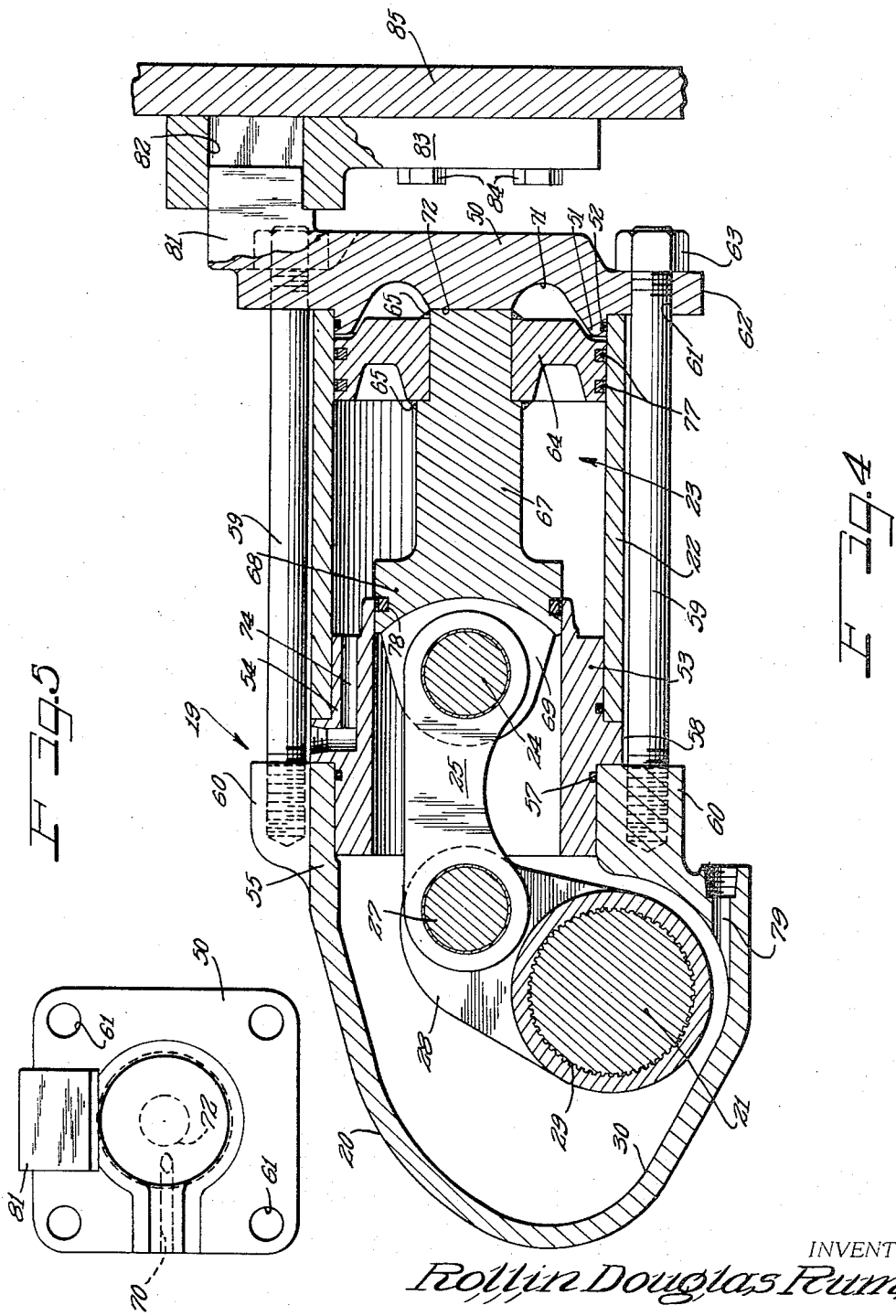
INVENTOR.
Rollin Douglas Rumsey
BY  ATTORNEYS

United States Patent Office 3,370,638
Patented Feb. 27, 1968

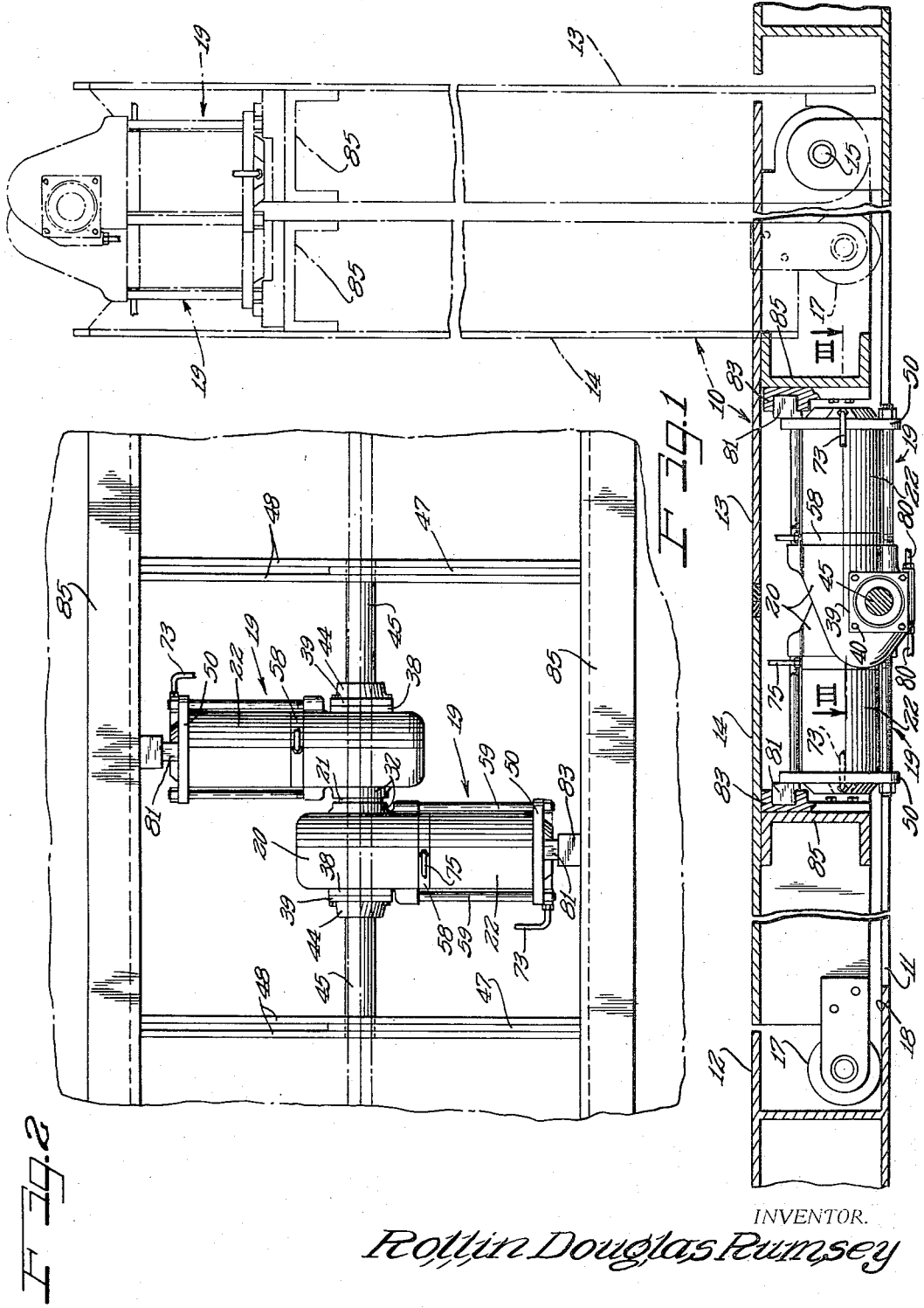

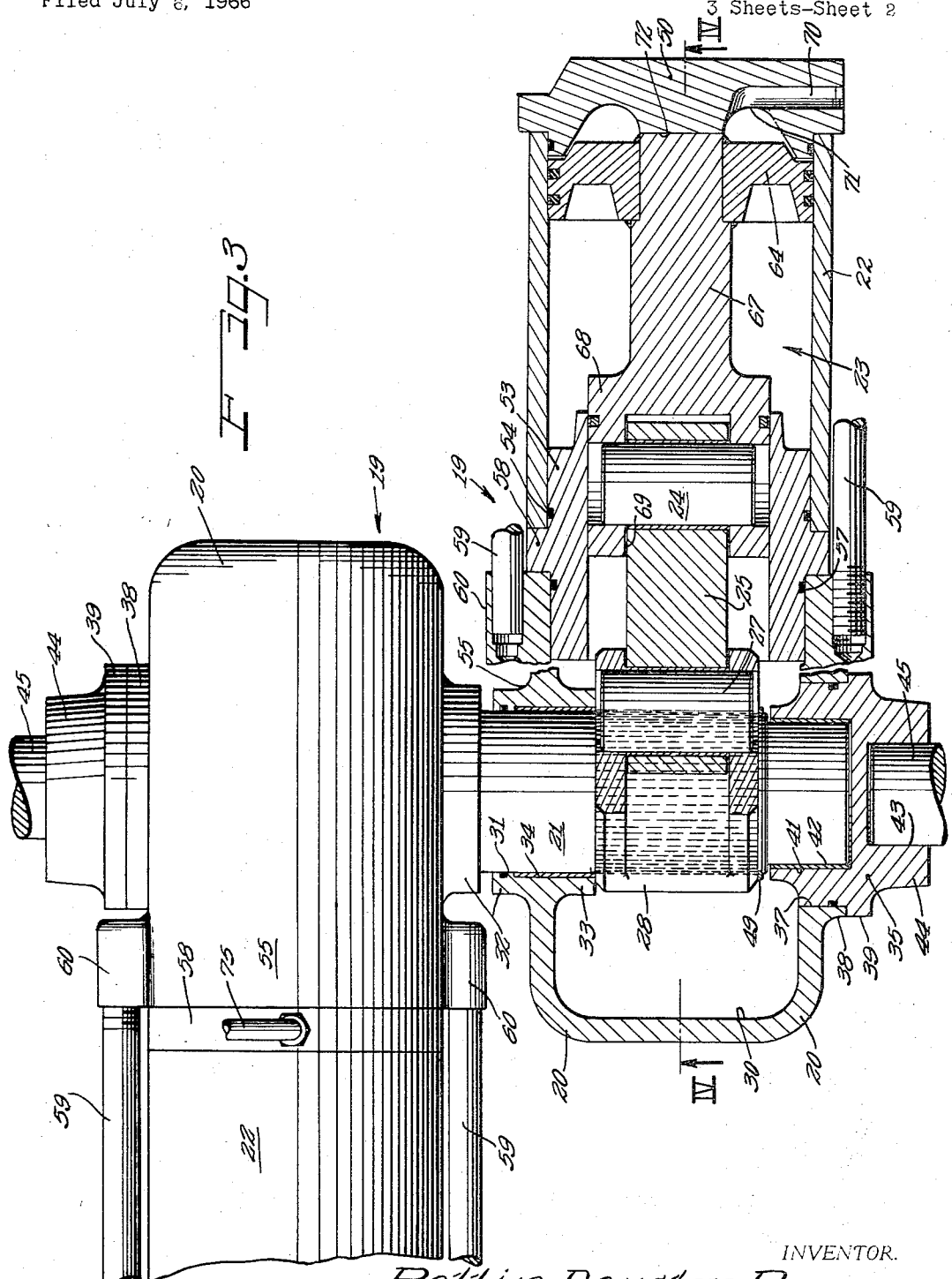

3,370,638
PISTON HATCH ACTUATOR ASSEMBLY
Rollin Douglas Rumsey, Buffalo, N.Y., assignor to Houdaille Industries, Inc., Buffalo, N.Y., a corporation of Michigan
Filed July 6, 1966, Ser. No. 563,257
13 Claims. (Cl. 160—188)

ABSTRACT OF THE DISCLOSURE

Rotary actuators for operating hatchway covers and the like comprise a tubular cylinder having respective opposite end closures defining with a piston reciprocable therein pressure fluid chambers. A hollow head member is assembled with the housing and journals a shaft to which the piston is connected by link means. Adjacent to the head member is a closure ring through which the piston rod extends slidably.

---

This invention relates to novel piston lever actuator means for efficient power operation of relatively heavy closures such as hatch covers, doors, and the like, between open and closed positions.

For heavy duty closures such as hatch covers of cargo vessels, bulkhead doors, and the like involving heavy movable panels or sections, hydraulic rotary actuators, and more particularly piston lever actuators are highly desirable. Heretofore, quality steel alloy castings have been employed successfully in the body or housing portions of the actuators. These castings have been constructed to withstand very high bursting pressures. As a practical matter, however, by at least currently practiced metal casting techniques, great difficulty has been experienced in procuring pressure-proof hollow castings free from porosity, slag inclusions, shrink pockets and cracks. Hence, the castings have been an excessive cost factor in these actuators.

It is therefore an important aim of the present invention to reduce the dependence upon or eliminate metal castings in the housing bodies of heavy duty piston lever rotary actuators and effect substantial cost reductions therein.

Another object of the invention is to provide a novel piston lever rotary actuator comprising an advantageous combination of cast, forged and high strength tubular steel parts.

A further object of the invention is to provide a piston lever rotary actuator having a novel balanced torque piston arrangement.

Still another object of the invention is to provide a piston lever rotary actuator having a novel stepped piston structure.

A still further object of the invention is to provide a piston lever rotary actuator having a new operating pressure relationship.

Among additional objects of the invention are the provision of simplifications in construction, reduction in weight, more compact size, simpler sealing against leakage, novel means for mounting, new means to facilitate assembly, and the attainment of substantial economies in overall costs.

According to the principles of the invention, an actuator adapted for such means as operating a hatch cover has a tubular housing providing a cylinder within which a piston is relatively slidably reciprocably mounted between closure members on the ends of the cylinder and defining actuating pressure fluid chambers with the opposite ends of the piston. A hollow head is assembled with the housing and has a shaft journalled on an axis offset from and transverse to the axis of the piston, with a torque arm lever on the shaft connected by a link to the piston. The cylinder end nearest the hollow head has a ring-shaped member through which the piston rod extends slidably.

Other objects, features and advantages of the present invention will be readily apparent from the following detailed description of a preferred embodiment thereof taken in conjunction with the accompanying drawings, in which:

FIGURE 1 is a generally schematic sectional elevational view showing a hatch cover installation embodying features of the invention;

FIGURE 2 is a plan view of the actuators and supporting frame of the hatch cover of FIGURE 1;

FIGURE 3 is an enlarged fragmentary section and plan view taken substantially along the line III—III of FIGURE 1;

FIGURE 4 is a longitudinal sectional view taken substantially along the line IV—IV of FIGURE 3; and FIGURE 5 is a rear elevational view of the end closure for the cylinder of the rotary actuators.

On reference to FIGURE 1, a hatch cover assembly 10 is mounted for closing disposition over a hatchway or opening 11 within a ship deck 12, or the like. In this instance, the hatch cover 10 comprises two complementary cover panel sections 13 and 14, with the section 13 pivotally mounted along one edge to the deck beam structure, as indicated at 15. On the other cover section 14 are antifriction roller means 17 arranged to ride track means 18 provided by the deck frame along the opening 11. Through this arrangement, the cover panel sections 13 and 14 are adapted to lie in coplanar side-by-side relation closingly over the hatchway 11, as shown in full outline in FIGURE 1, and are adapted to be moved into a folded booked open position relative to one another and to the deck 12, as shown in dot dash outline. Although the hatch cover 10 is shown as comprising only a pair of cover panels, the principles of the invention are adapted for multiples of such paired panels or sections for long hatchway openings. In addition, certain principles of the invention are adapted for operating single section closures such as hatch covers, and the like, between closed and open positions, as will be evident.

Improved means for actuating the cover sections 13 and 14 between the hatchway closing and hatchway open positions comprise powered hinge means including a pair of rotary actuators 19 mounted on the respective cover sections and coupled for synchronized operation. Although a coupled pair of the actuators 19 is shown and which may suffice for a hatch cover 10 which is relatively narrow, in a wider cover assembly a plurality of such pairs of actuators may be utilized along the hinge joint of the panels.

Each of the actuators 19 is of the piston-lever rotary type.

In a rugged lightweight, economical and efficient construction, each of the actuators 19 comprises a multipart body including a cast metal head portion 20 mounted for rotation about a shaft 21 and having extending linearly therefrom an actuating lever cylinder 22 within which is relatively reciprocably operatively mounted a torque piston 23 (FIGS. 3 and 4) connected by a wrist pin 24 to one end portion of a piston rod link 25 which at its opposite end portion is connected by a bearing pin 27 to the distal end portion of a torque thrust arm 28 keyed as by means of splines 29 to the shaft 21. Although each of the cooperatively paired actuators 19 may have a separate shaft 21, with the shafts secured in relatively fixed nonrotatable relation, a compact arrangement, as shown, has the shaft 21 common to both of the actuators. The construction and relationship and operation of the actuators 19 is such that by hydraulic motivation of the actuators to effect relative opposite swinging movements of the actuators about the shaft 21 opening or closing torque is selectively applied to the hatch cover sections 13 and 14.

In order to achieve optimum utilization of material for minimum weight and maximum strength, the head portion 20 is constructed in as nearly as practicable spherical hollow form. Since in the present instance the head portion 20 of actuator body is not required to carry any hydraulic load it is adapted to be made from relatively low cost material such as ductile iron in cast form and lending itself to each machining. Within the head casting 20 is an ample chamber 30 to accommodate the torque arm 28 operatively. At that side of the head 20 which opposes the side of the head of the companion actuator, it is provided with a journal bore 31 defined by reinforcing hub flange 32 which extends outwardly, and a counterpart hub flange 33 which extends inwardly. Mounted in the bore 31 is a bearing for the shaft 21 comprising preferably a self-lubricating bushing 34.

At the opposite side of the head 20 means are provided affording a shaft bearing and closure as well as hinge pin coupling. For this purpose, a cap or cover member 35, which may be constructed as an economical casting or forging, fits closely in a side opening 37 in the head 20 aligned with the journal bore 31 and defined by an outwardly projecting reinforcing flange 38 against which a lateral attachment flange 39 of the cap seats and is attached as by means of screws 40. Opening inwardly from the cap 35 is a blind end journal bore 41 desirably lined with a self-lubricating bearing bushing 42 within which the associated end portion of the shaft 21 is journalled. Coaxial with the journal bore 41 is an outwardly opening blind end bore 43 defined by an outwardly extending annular flange 44 and providing a socket within which is engaged in torque-free relation one end portion of a hinge pin 45 extending coaxially with the shaft 21. The other end portion of the pin 45 couples respective hinge bars 47 and 48 rigid with the respective hatch cover sections 13 and 14.

Assembly of the torque arm 28 into the head chamber 30 is facilitated by having the opening 37 of large enough size to pass the torque arm therethrough before mounting of the cap 35. Within the housing 30, the torque arm is maneuvered into position wherein it receives within a suitable longitudinal bifurcation the associated end portion of the link 25 which is then coupled by inserting the connecting pin 27. Then the arm is maneuvered into its proper orientation with respect to the shaft 21, namely, upwardly and slightly angled toward the cylinder 22 to extend across the cylinder axis, and assembly of the shaft within the splined eye of the arm 28 effected. Thereupon a snap ring 49 is affixed to the shaft within a suitable groove and serves as an axial thrust shoulder confronting the cap-opposing side of the torque arm 28. At its opposite side, the torque arm confronts the hub flange 33. Because the bearing supports for the shaft 21 are close to the sides of the torque arm 28 and of substantial length, the shaft is thoroughly supported against bending stresses.

Substantial advantage accrues from confining all high internal hydraulic pressures to the cylinder 22 which is provided with closures at its opposite ends. Desirably the cylinder comprises simply a low cost high strength steel tube. Commercially available straight steel pipe suitably honed on its inside cylindrical surface serves the purpose. One end of the cylinder is closed by an end cover closure 50 which may comprise a forged steel flange member having an annular axial flange 51 telescopically engaging within the outer end margin of the cylinder and carrying a high pressure static seal 52 against leakage through the joint. At its opposite, inner end, the cylinder 22 is coupled with the head 20 by means of a combination closure, tubular coupling flange and smaller inside diameter torque stabilizing cylinder ring member 53. One end flange portion of the member 53 is telescopically engaged within the associated end portion of the cylinder 22, and a static high pressure sealing ring 54 seals the joint. The opposite end portion of the member 53 is telescopically engaged within an integral collar 55 on the head 20 defining an opening into the chamber 30. A static ring seal 57 seals this joint. Between the opposed ends of the cylinder 22 and the collar 55 a lateral locating or attachment flange 58 on the member 53 is engaged in clamping relation under the attaching thrust of a set, such as four, of stud bolts 59 anchored in suitable bosses 60 on the collar 55 and extending through bolt holes 61 in a lateral flange 62 on the end closure 50 thrustingly driven axially against the contiguous end of the cylinder 22 by means of nuts 63 threaded onto the outer ends of the bolts.

Desirably the piston structure 23 has dual diameter torque stabilizing portions. This includes a larger diameter head 64 coacting in reciprocably slidable relation with the cylinder 22 and mounted on and secured as by welding 65 to the outer or rear end portion of a substantially smaller diameter piston rod 67. On its inner end portion the piston rod 67 has integrally thereon a crosshead 68 of smaller diameter than the piston head 64 and in reciprocally slidably guided coaction within the cylinder ring member 53. A central bifurcation slot 69 at the inner extremity of the piston rod receives the connecting link 25.

High pressure hydraulic fluid is introduced into the cylinder 22 between the end closure 50 and the crown of the piston head 64 through a passage 70 leading in through preferably one edge of the end closure and communicating at its inner end with an annular inwardly opening clearance groove 71 about a stop boss 72 projecting centrally inwardly on the closure and opposing the adjacent end of the piston rod 67. At its outer end the passage is connected with a conduit 73 which communicates with a suitable source of hydraulic pressure in a hydraulic control system to effect pressurized separation of the end closure 50 and piston head 64 to operate the actuator for opening of the associated hatch cover, and, alternatively, drainage during closing of the hatch cover.

Hydraulic pressure fluid for effecting return or closing movement of the hatch covers by action of the actuators 19 is introduced into the working chamber within the cylinder 22 between the piston head 64 and the member 53 to thrust against the inner side of the piston head 64. Conveniently this is effected through a suitable passage 74 in the member 53 arranged at its outer end for connection thereto of a suitable hydraulic conduit 75 communicating with the hydraulic control system for alternative introduction of hydraulic fluid and bleeding off of hydraulic fluid.

To resist high pressure leakage past the piston head 64, it is provided with a pair of piston ring type high pressure dynamic sealing rings 77 engaging the cylinder wall. Since lower hydraulic pressure within the working chamber at the inner side of the piston head 64 suffices for return or closing movement of the hatch covers, a single dynamic piston ring type pressure sealing ring 78 carried by the crosshead 68 in engagement with the cylindrical wall of the member 53 will suffice. Any leakage past the seal 78 into the head chamber 30 is drained off through a drain passage 79 desirably provided to lead from the lowermost portion of the chamber and connected to a bleed-off conduit 80.

A desirable means for attaching the piston lever end portion of each of the actuators 19 to its associated hatch cover section comprises a preferably square cross section rugged integral boss 81 on the upper central portion of the end cover 50 projecting rearwardly into a complementary socket 82 in a bracket member 83 secured as by means of screws or bolts 84 to a frame member 85 of the hatch cover section.

In operation, because the torque arm 28 in each instance is fixed on the shaft 21 and the piston cannot therefore move axially toward the shaft 21 upon high pressure fluid force being introduced between the end closure 50 and the piston head 64, a cranking torque is generated between the cylinder 22 and the piston 23 for opening the associated closure. Since the actuators 19 are in opposed relation, and the torque arms 28 extend generally upwardly and rearwardly in each of the actuators, the hydraulic pressure acting on the crown ends of the respective piston heads 64 and the opposed end closures 50 forces them apart and causes the actuators to move in generally jack-knifing relation about the shaft 21 with a consequent upward thrust of the shaft to cause the hatch cover panel sections 13 and 14 to jackknife or book correspondingly and move into the open position indicated in dot dash outline in FIGURE 1. Upon release of the cover-opening pressure and pressurizing the return or closing motivation pressure chamber within the cylinder 22 through the passages 74, return or closing movement of the hatch cover sections through the action of the actuators is effected.

It will be understood that variations and modifications may be effected without departing from the spirit and scope of the novel concepts of this invention.

I claim as my invention:

1. In a construction having an opening such as a hatchway and means for closing the same defining a hinge joint including a non-rotating shaft and a cover member adapted to be moved between closed and open positions about said hinge joint and relative to said opening:
   a torque arm projecting in fixed lateral relation on said shaft;
   a link pivotally connected at one end to the distal end portion of said arm;
   a piston structure having a rod portion pivotally connected to the opposite end of the link and having a piston head substantially spaced from the link with a crown on the piston head facing away from the link;
   a tubular hydraulic pressure working chamber cylinder relatively reciprocably slidably housing said piston and having a pressure sealed closure on one end opposing said crown and an annular member on its opposite end reciprocably slidably guiding said piston rod portion therethrough;
   a head structure rigid with the cylinder and pivotally engaging said shaft;
   means fixedly attaching said cylinder and head structure to said cover member;
   and means for introducing pressure fluid into said cylinder alternately between said closure, annular member and said piston to effect torque lever reaction between said cylinder and piston and thereby moving said cover member between said closed and open positions.

2. A construction as defined in claim 1, in which said head structure defines a chamber enclosing said torque arm and into which chamber said annular member opens for connection of the link between the arm and the piston rod, and said chamber being receptive of leakage of pressure fluid from the cylinder through said annular member, and means for bleeding the fluid from said chamber.

3. A construction as defined in claim 1, in which said means fixedly attaching the cylinder and head structure to said cover member comprise a rugged lug projecting from a marginal portion of said pressure sealed closure and a bracket having a socket receiving said lug, and a structure defining said hatchway and having said bracket fixedly attached thereto.

4. For use in a construction providing a hatchway or other opening and means including at least one cover member for closing the same and defining a hinge joint adapted to be moved between closed and open positions relative to said opening, a piston lever actuator assembly comprising:
   a nonrotating hinge joint shaft;
   a torque arm in fixed laterally projecting relation on said shaft;
   a link pivotally connected at one end to the distal end portion of said arm;
   a piston structure having a rod portion pivotally connected to the opposite end of the link and having a piston head with a crown facing away from said link;
   a tubular hydraulic pressure working chamber cylinder relatively reciprocably slidably housing said piston end having a pressure sealed closure on one end and opposing said crown and an annular member on its opposite end reciprocably slidably guiding said piston rod portion therethrough;
   a head structure rigid with the cylinder for pivotally engaging said shaft;
   means for fixedly attaching said cylinder and head structure to said cover member;
   and means for introducing pressure fluid into said cylinder alternately between said closures and said piston to effect torque lever reaction between said cylinder and said piston for thereby moving said actuator rotatably about the shaft to move the attached cover member between said closed and open positions.

5. An actuator as defined in claim 4, in which said head structure comprises a hollow casting defining a chamber about said torque arm and communicating through said annular member with said cylinder for connection of the link with the arm and piston rod.

6. An actuator as defined in claim 5, in which said cylinder is a high strength steel pipe piece, and said annular member comprises coupling means connecting the cylinder to the head structure.

7. An actuator as defined in claim 6, in which said annular member comprises a ring member having an intermediate annular outwardly projecting attachment flange engaged between said head structure and said cylinder, and means securing said pressure sealed closure to said head structure comprising stud bolts drawing said pressure sealed closure toward the head structure and thereby thrusting said cylinder into clamping engagement with said flange.

8. An actuator as defined in claim 4, in which said piston rod portion has adjacent to its connection with said link a cross head which is in slidable engagement with said annular member.

9. An actuator as defined in claim 4, in which said means for introducing pressure fluid includes a passage through said pressure sealed closure and a passage through said annular member and both of said passages adapted to be connected with a pressure fluid source.

10. An actuator as defined in claim 4, in which said head structure comprises a hollow casting having on one side a flanged journal bore through which said shaft extends and having on the opposite side an opening aligned with said shaft bore but of substantially larger diameter, and a combination cover member and bearing closing said opening and rotatably supporting a journal end portion of said shaft.

11. An actuator as defined in claim 10, in which said cover member has an outwardly opening socket receptive of a hinge pin.

12. An actuator as defined in claim 10, in which said opening in the head structure is of sufficient size to enable assembly of said torque arm into the head chamber through such opening and assembly of the torque arm with the shaft, the shaft and torque arm being keyed against relative rotation, and a lock ring mounted on the shaft between the torque arm and said cover member.

13. An actuator as defined in claim 4, in which said attaching means comprise bolts drawing said head member and said first mentioned closure toward one another with said housing member therebetween.

References Cited
UNITED STATES PATENTS

| | | | |
|---|---|---|---|
| 2,981,326 | 4/1961 | MacGregor | 160—188 |
| 3,023,629 | 3/1962 | Wagner et al. | 74—105 |
| 3,154,136 | 10/1964 | Ligh | 160—188 |
| 3,288,202 | 11/1966 | Ramsey | 160—188 |

DAVID J. WILLIAMOWSKY, *Primary Examiner.*

PETER M. CAUN, *Assistant Examiner.*